Patented Oct. 25, 1932

1,884,241

UNITED STATES PATENT OFFICE

ELOI RICARD AND HENRI MARTIN GUINOT, OF MELLE, FRANCE, ASSIGNORS TO U. S. INDUSTRIAL ALCOHOL CO., OF NEW YORK, N. Y., A CORPORATION OF WEST VIRGINIA

PROCESS OF EXTRACTING ACETIC ACID FROM PYROLIGNEOUS SUBSTANCES

No Drawing. Application filed July 19, 1929, Serial No. 379,575, and in Belgium July 28, 1928.

The extraction of acetic acid in pure state from aqueous solutions has already been accomplished very advantageously by utilizing judiciously chosen solvents and acting methodically on the aqueous solutions containing the acid substantially exempt from other organic materials. But this mode of operation is not directly applicable to pyroligneous acid which contains, in addition to acetic acid, numerous impurities susceptible of passing into solution in the extracting solvent and consequently capable of opposing the regeneration thereof in a pure state.

The obtaining of acetic acid known as "good taste" totally free from tars, from pyroligneous substances has not up to the present been industrially possible save with repeated distillations which, in addition to the high consumption of steam, provoke very considerable losses in acetic acid because of the waste caused by these various operations and from the fact that a part of the acid remains retained in the residuary tars. Finally the output in acetic acid with "good taste" is mediocre as the production of about 20% of acid strongly polluted with tars known as "bad taste" acid can not be avoided.

It has been proposed to extract the tars by a suitable solvent such as in the French Patent No. 506,281 of January 31, 1918, but one is confronted with the difficulty that no solvent extracts practically the whole of the tars. Consequently the acid obtained is not the good taste acid and one is obliged to return to the process involving successive distillations which again gives bad taste. On the other hand the major portion of the solvents extract simultaneously with the tars a certain quantity of acid which, if it is not decided to discard it, gives by regeneration bad taste. In fact this method at the present time has no industrial application.

It has been proposed with greater success (Brewster, Suida) instead of seeking to extract the tars from the pyroligenous substances, to extract the acetic acid, either from the pyroligneous liquor, or from the pyroligneous vapors, the tars remaining in the residuum of the operation.

But there again the solvent employed always becomes charged with a certain quantity of tars, which results either in costly regeneration, or in the production of bad tastes depending upon how much more volatile the solvent is than the acetic acid.

In order to be able to apply to pyroligneous acid the methods of extraction including the utilization of solvents judiciously chosen acting methodically on aqueous solutions containing the acid, it is necessary to previously subject the pyroligneous substances to a suitable treatment.

Our present invention has for an object the elimination of undesirable impurities from the pyroligneous substances which would be liable to be subsequently extracted with acetic acid by the solvent brought into play.

It consists in subjecting the pyroligneous substances in liquid state to a methodic washing by means of nuclear-alkylated cresols, such as the ethyl, propyl, butyl and amyl-cresols, for example, these products presenting over the cresols themselves the advantage of being perfectly insoluble in water or in a 10% acetic water solution, of well dissolving the troublesome impurities such as the tars and of having on the contrary a poor dissolving power for the acetic acid and for the water.

The present invention is further characterized by the fact that we do not seek to completely remove the tars from the pyroligneous substances but that we merely remove therefrom the impurities which would risk pollution of the principal solvent subsequently utilized for the extraction of acetic acid. Thus after methodic washing of the pyroligneous substances with butylcresol for example, there remains in solution the "latent" tars which it is possible to cause to appear by boiling for considerable time or complete evaporation of the acetic aqueous solution. Said tars are in no way troublesome for the subsequent extraction of the acetic acid by means of amyl-acetate for example. They remain finally in the aqueous solution from which acid has been extracted and are eliminated therewith.

As to the tar-removing solvent charged with tars, it is recovered by ordinary distillation or better by distillation and carrying off by steam, the tars remaining as a residuum. The small quantity of acid extracted during the methodic washing can be recovered during distillation.

Practically, the tar-removing solvent serving to refine the pyroligneous substances is composed of a mixture of isomeric nuclear-alkalated cresols. We can, however, add to this mixture a certain quantity of hydrocarbons, which has the advantage of greatly facilitating decantation, diminishing the solubility of the acetic acid in the solvent and facilitating the recuperation of a minimum quantity of acid which is nevertheless dissolved. In fact, the hydrocarbons form as a whole with the acetic acid mixtures having a minimum boiling point, in such wise that during recovery of the tar-removing solvent, the acetic acid is obtained in solution relatively concentrated at the same time as the hydrocarbons at the start of the distillation.

*Example*

Given to treat a pyroligneous substance in raw state containing 10% acetic acid and 5% tars (the latter are determined by weighing the residuum obtained after complete evaporation of the water).

In a methodic washing apparatus of suitable character, we continuously treat the pyroligneous substance with 1/5 of its volume in butylcresol. The latter is obtained with an excellent yield by treating the ordinary cresol with butylic alcohol in the presence of chloride of zinc.

The butylcresol is practically insoluble in water and in a solution of 10% acid. It dissolves from 3 to 4 times less acetic acid and water than would the cresol, per se. On the contrary it has a considerable power of extraction for the tars and phenolic derivatives which would be subsequently troublesome to the extraction of the acetic acid by means of amylacetate for example.

The butycresol leaves the washing apparatus strongly colored black. The pyroligneous substance on the contrary is slightly tinted straw yellow. Said pyroligneous substance purified still contains a small quantity of "latent" tars but these are not troublesome as we have found, as previously pointed out, that they remain in solution in the aqueous layer during extraction of the acid by a solvent such as amylacetate for example.

The butylcresol charged with tars is recovered by distillation of ordinary character or better by distillation with carrying off by steam. The tars obtained as residuum are evacuated while hot in the usual manner.

We do not depart from the spirit of the invention if instead of operating with pyroligneous solutions, we treat the pyroligneous substances in a vapor state. Neither do we depart from the spirit of the invention if we operate either entirely or in part under pressures other than atmospheric pressure.

Having described our invention what we claim as new and desire to secure by Letters Patent is:

1. A process of extracting acetic acid from pyroligneous material which comprises treating the pyroligneous material with nuclear-alkylated cresols, and subsequently subjecting the pyroligneous material to treatment with a solvent capable of extracting the acetic acid from the aqueous solutions thereof.

2. A process of extracting acetic acid from pyroligneous material which comprises treating the pyroligneous material with a solvent of tars from among the group of ethyl-, propyl-, butyl- and amyl-cresol, and subsequently subjecting the pyroligneous material to treatment with a solvent capable of extracting the acetic acid from the aqueous solutions thereof.

3. A process of extracting acetic acid from pyroligneous material which comprises subjecting the liquid pyroligneous material to methodic washing by means of nuclear-alkylated cresols, and subsequently subjecting the pyroligneous material to treatment with a solvent capable of extracting the acetic acid from the aqueous solutions thereof.

4. A process of extracting acetic acid from pyroligneous material which comprises treating the pyroligneous material with a nuclear-alkylated cresols to which hydrocarbons have been added, and subsequently subjecting the pyroligneous material to treatment with a solvent capable of extracting the acetic acid from the aqueous solutions thereof.

5. A process of extracting acetic acid from pyroligneous material which comprises treating the pyroligneous material with nuclear-alkylated cresols, subsequently subjecting the pyroligneous material to treatment with a solvent capable of extracting the acetic acid from the aqueous solutions thereof, and recovering the tar solvent and the small amount of acetic acid dissolved therein by distilling the tar solution in the presence of hydrocarbons.

6. The step of removing tars from pyroligneous material which comprises treating the pyroligneous material with a nuclear-alkylated cresol.

7. The step of removing tars from pyroligneous material which comprises treating the pyroligneous material with a solvent of the following group: ethyl-cresol, propyl-cresol, butyl-cresol, amyl-cresol.

8. The step of removing tars from pyroligneous material which comprises subjecting the liquid pyroligneous material to methodic washing with a nuclear-alkylated cresol.

9. The step of removing tars from pyroligneous material which comprises treating the pyroligneous material with butyl-cresol.

10. The step of removing tars from pyroligneous material which comprises treating the pyroligneous material with a nuclear-alkylated cresol to which hydrocarbons have been added.

11. The steps of removing tars from pyroligneous material which comprises treating the pyroligneous material with a nuclear-alkylated cresol, and recovering the tar solvent by steam distillation of the tar solution.

12. The steps of removing tars from pyroligneous material which comprises treating the pyroligneous material with a nuclear-alkylated cresol, and distilling the tar solution in the presence of hydrocarbons to recover the tar solvent and the small amount of acetic acid dissolved thereby.

In testimony whereof we have signed this specification.

ELOI RICARD.
HENRI MARTIN GUINOT.